United States Patent [19]

Steudler, Jr.

[11] Patent Number: 4,984,537

[45] Date of Patent: Jan. 15, 1991

[54] NIPPLE FOR FEEDING LIQUIDS TO FOWL AND/OR SMALL ANIMALS

[75] Inventor: Frederick W. Steudler, Jr., New Providence, Pa.

[73] Assignee: Val Products, Inc., Bird-in-Hand, Pa.

[21] Appl. No.: 401,676

[22] Filed: Sep. 1, 1989

[51] Int. Cl.$^5$ .............................................. A01K 7/06
[52] U.S. Cl. .................................................. 119/72.5
[58] Field of Search ...................... 119/72, 72.5, 75; 251/349, 350, 354; 137/616, 616.3

[56] References Cited

U.S. PATENT DOCUMENTS

| | | | |
|---|---|---|---|
| 3,416,499 | 12/1968 | Wilmot | 119/72.5 |
| 3,734,063 | 5/1973 | Atchley | 119/72.5 |
| 4,284,036 | 8/1981 | Hostetler | 119/72.3 |
| 4,329,941 | 5/1982 | Niki | 119/72.5 |
| 4,346,672 | 8/1982 | Niki | 119/72.5 |
| 4,416,221 | 11/1983 | Novey | 119/72.5 |
| 4,458,632 | 7/1984 | Niki | 119/72.5 |
| 4,589,373 | 5/1986 | Hostetler et al. | 119/72.5 |
| 4,606,301 | 8/1986 | Steudler, Jr. | 119/72.5 |
| 4,637,345 | 1/1987 | Hostetler | 119/72.5 |

FOREIGN PATENT DOCUMENTS 0437506 12/1974 U.S.S.R. .............................. 119/72.5

*Primary Examiner*—Robert P. Swiatek
*Assistant Examiner*—Todd E. Manahan
*Attorney, Agent, or Firm*—Diller, Ramik & Wight

[57] ABSTRACT

A nipple drinker particularly adapted for feeding liquid to fowl and/or small animals which includes a passage, a ball valve closing the passage when seated on at least one valve seat, and a ball valve actuating stem having a head and a pin, the head having a concave surface and a through bore opening therethrough, and an exterior surface of the pin having at least one water flow channel whereby both small and large fowl and/or animals can actuate the stem to unseat the ball valve in proportion to the force applied to the stem which not only provides proportional water flow but also assures automatic self-cleaning or flushing of the recess.

16 Claims, 1 Drawing Sheet

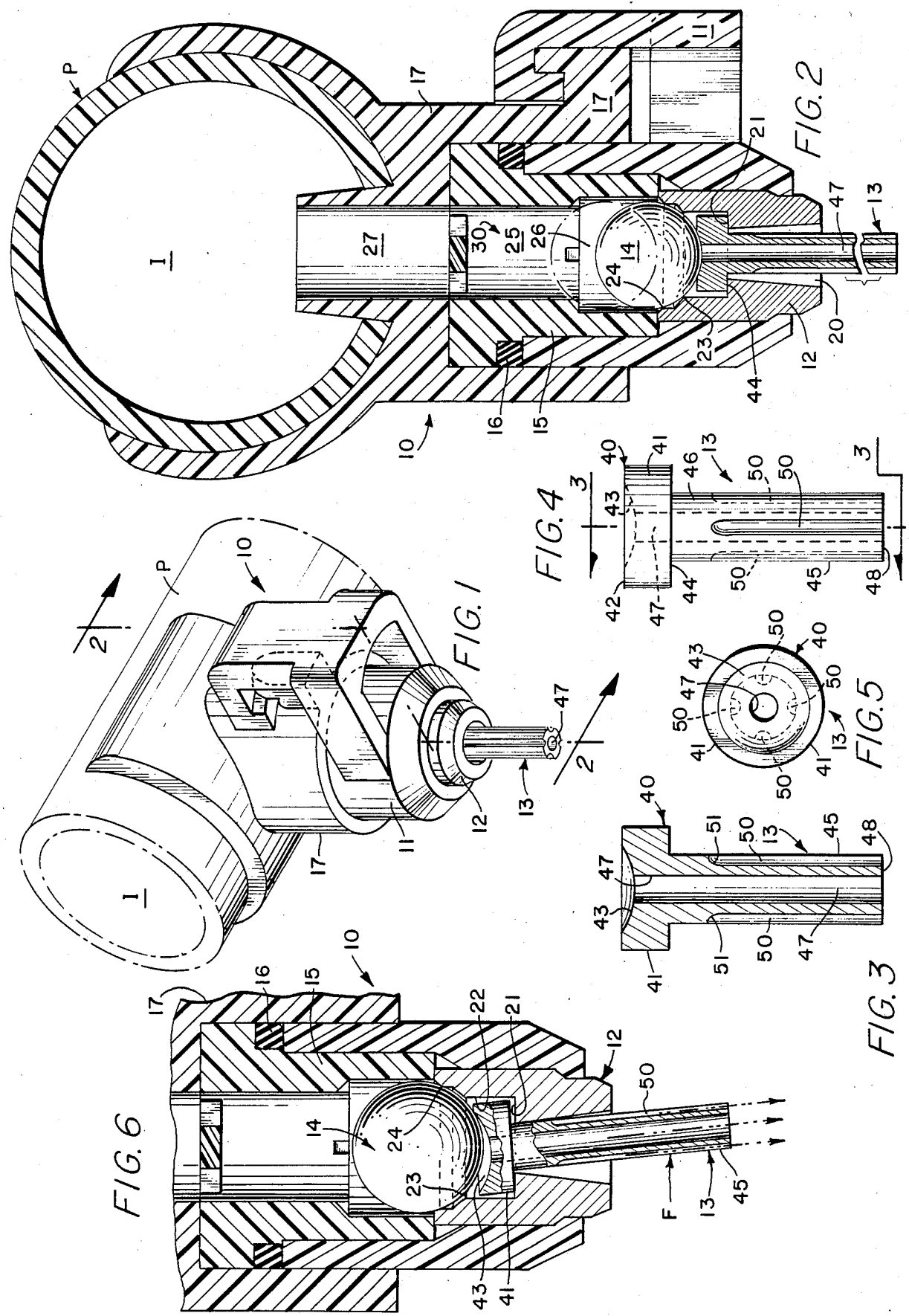

NIPPLE FOR FEEDING LIQUIDS TO FOWL AND/OR SMALL ANIMALS

BACKGROUND OF THE INVENTION

The invention is directed to an improvement in a nipple particularly adapted for feeding liquid to fowl and/or small animals, and specifically is an improvement over the nipple disclosed in commonly assigned U.S. Pat. No. 4,606,304 in the name of Frederick W. Steudler, Jr. granted on Aug. 19, 1986. The nipple of the latter-identified patent has proved exceedingly efficient in operation and has found wide acceptance in the poultry industry. However, two problems can occur over extended use of the nipple.

The first problem is that debris can collect in the concave recess of the head of the drinking pin or stem which can prevent the ball valve from seating upon its associated valve seat. This results in erratic ball lifting which, though a major problem, is not as severe as leakage that can occur between the ball and the valve seat as direct accumulates in the concave recess of the drinking pin head. If sufficient dirt/debris accumulates in the concave recess of the drinking pin head, the ball valve will not seat upon its valve seat and such leakage creates a continuous flow of water through associated cages into manure pits therebelow resulting in highly undesired wet manure.

A second problem is that for a predetermined size nipple the tolerances are such as to permit only a predetermined volume of water to be delivered upon full unseating of the ball valve from its valve seats. When the drinkers are associated with day old, week old, or relatively young birds, limited water flow is quite acceptable. However, as the fowl grows and becomes larger there is a proportional demand for more water which reaches a maximum demand with relatively large full-grown birds, particularly turkeys. Obviously, if large drinkers were used maximum water flow would be achieved for large birds, but day old, week old birds simply do not have the strength to lift or actuate larger drinking pins of such large drinkers. An alternative would be to use two different sets of drinkers, one set of drinkers being smaller, lighter and having tolerances providing adequate watering for smaller and younger birds, and other drinkers being larger, heavier and having tolerances for greater water flow for larger birds. The disadvantage in this system is that half the drinkers would be virtually unusable half the time.

SUMMARY OF THE INVENTION

In keeping with the foregoing, a primary object of the present invention is to provide a novel nipple characterized by a flow passage which includes a valve and at least one valve seat and a drinking pin or steam which includes a head having a concave surface and a pin or portion with a bore extending through the pin from the concave surface through an end face of the stem exteriorly of the drinker. Due to this construction any debris which might accumulate in the concavity of the concave surface is virtually automatically flushed therefrom through the bore virtually every time the head is tilted and the ball is unseated. Furthermore, water will not only flow along the exterior of the drinker pin in the conventional fashion when the ball valve is unseated, but water will also flow through the bore, and thus depending upon the amount that the ball has unseated, a proportional amount of water will be available to a bird actuating the pin. A smaller younger bird would actuate the pin with less force than a larger, older bird, and in one case little if any water would flow through the bore, yet sufficient water would flow along the exterior of the stem to feed a younger bird while an older larger bird would more forcefully actuate the pin resulting in a proportionately greater flow of water, particularly through the bore. Accordingly, both young and old birds/fowl can utilize the same drinker from day old through maturity, and a proportionate water flow can be achieved in the absence of leakage because of the automatic cleansing of debris from the concave surface of the head concavity.

With the above, and other objects in view that will hereinafter appear, the nature of the invention will be more clearly understood by reference to the following detailed description, the appended claims and the several views illustrated in the accompanying drawings.

BRIEF DESCRIPTION OF THE DRAWING

FIG. 1 is a perspective view of a novel nipple or drinker constructed in accordance with this invention, and illustrates the nipple connected to a plastic water pipe.

FIG. 2 is an enlarged cross sectional view taken generally along line 2—2 of FIG. 1, and illustrates the components of the nipple including a ball valve seated upon a pair of valve seats of an insert and a drinker pin or steam having an axial through bore therein.

FIG. 3 is a cross sectional view taken generally along line 3—3 of FIG. 4, and illustrates the bore, the concave surface, and exterior flow channels of the drinker pin.

FIG. 4 is a side elevational view of the drinker pin, and illustrates details thereof.

FIG. 5 is a top plan view of the drinker pin looking downwardly in FIG. 4, and illustrates the concave surface of the head, the bore opening therethrough and the equal angular spacing of four of the flow channels.

FIG. 6 is a fragmentary cross sectional view similar to FIG. 1, and illustrates the ball valve in its unseated position and the proportional flow of water through the bore of the pin and exteriorly of the pin in and along the channels thereof.

DESCRIPTION OF THE PREFERRED EMBODIMENT

A novel nipple or drinker constructed in accordance with this invention is generally designated by the reference numeral 10, and is formed by a lower plastic housing 11, a metallic insert 12, a metallic drinker pin or stem 13, a metallic spherical valve or ball valve 14, a plastic lid 15, an O-ring seal 16 of rubber or similar material, and an upper plastic housing 17. The nipple or drinker 10, including all of the components thereof except the drinker pin or stem 13, correspond identically to the correspondingly numbered components of U.S. Pat. No. 4,606,301. Accordingly, the specified details of these elements or components which are not hereinafter described are herein totally incorporated by reference.

The insert 12 is pressed-fit into the lower housing 11 and includes a frusto-conical passage portion 20, an annular surface or valve seat 21, a cylindrical surface or bore 22, a valve seat 23 and a valve seat 24. In the normal, home or closed position of the valve 14, the valve 14 seats upon and seals with the valve seats 23, 24. The frusto-conical passage portion 20, the cylindrical surface 22, and the unnumbered surfaces in part defining the valve seats 23, 24, in part define a passage or passage means 30 which is further defined by a bore 25 and a counterbore 26 of the lid 15 and a bore 27 of the upper housing 17 which opens into an interior I of a pipe P which is connected to a suitable source of water (not shown). The upper plastic housing 17 is, of course, adhesively bonded to the exterior of the pipe P, as described in U.S. Pat. No. 4,606,301.

The drinker pin or stem 13 is fully illustrated in FIGS. 3-5 of the drawings and includes a head 40 having an exterior peripheral or cylindrical surface 41, an upper axial surface 42 interrupted by a concave recess, surface or concavity 43 and a lower annular surface 44. An integral pin portion or stem portion 45 depends from the head 40 and includes a generally exterior cylindrical surface 46 and an internal circular bore 47 which extends the length of the drinker pin 13 from the concave surface 43 to and through an axial end face or surface 48. The cylindrical exterior surface 46 of the pin portion 45 is interrupted along its periphery or circumference by four equally circumferentially spaced generally parallel axially extending radially outwardly opening channels or grooves 50 which open through the axial end face 48 and end at blind ends 51 spaced from the annular surface or face 44. The curvature of the convex surface 43 corresponds identically to the curvature of the exterior surface (unnumbered) of the spherical ball valve 14 and when the components are assembled, as shown in FIG. 2 in the closed position thereof, a third valve seat is defined by the surface contact between the concave surface 43 and the exterior surface of the ball valve 14. A fourth valve seat is defined by the annular wall or surface 21 upon which seats the annular surface 44 of the head 40 of the drinker pin 13 (FIG. 2). Thus, in the closed position of the ball valve 14 there are four liquid seals formed, namely, two seals between the ball valve 14 and the valve seats 23, 24, another seal between the ball valve 14 and the concave surface 43 of the head 40 and a fourth seal between the surfaces 44, 21.

In the operation of the nipple or drinker 10, water in the interior I of the pipe P is conducted through the passage 30 and is prevented from passing beyond the ball valve 14 when the ball valve 14 is seated upon the valve seats 24, 23 and 43 and, of course, during the same time the head 40 of the drinker pin 13 is also seated upon the fourth valve seat 21 of the insert 12.

When a relatively young bird, such as a one-day to one-week old bird, pecks at the pin portion 45 of the drinker pin or stem 13, the same will tilt to tilt the head 40 in the manner illustrated in FIG. 6. Depending upon the magnitude of the lateral force applied to the pin portion 45, the head 40 and thus the ball valve 14 will be moved proportionately. Younger and/or weaker birds tend to tilt or pivot the drinker pin or stem 13 less than older and/or stronger birds. Accordingly, under minor lateral force applied to the pin portion 45 the head 40 will unseat along a very minor area of contact between the valve seat 21 and the annular surface 44, and the wall valve 14 will likewise unseat relative to the valve seats 23, 24 a very minimum degree. Under such minor lateral forces the ball valve 14 generally will not unseat from the concave surface or valve seat 43. Thus, under very low lateral forces applied to the pin portion 45 a very limited amount of water will flow past the valve seats 21, 23 and 24 and no water will flow through the bore 47. However, should a relatively strong and/or large bird, such as a turkey, apply a large force F (FIG. 6) against the pin portion 45 to tilt the drinker pin 13 appreciably beyond its normal position (FIG. 2) to a virtually maximum open condition, the ball valve 14 not only unseats from the valve seats 23, 24, but also unseats from the valve seat 43 causing water to be introduced into the bore 47 and to be discharged therefrom past the axial end face 48 to the drinking bird. Obviously, since the head 40 is tilted to its maximum the discharge of water both through the bore 47 and exteriorly of the pin portion 45 will also be at maximum. Accordingly, no matter the age or strength of a bird or small animal, the lateral force applied to the drinker pin 13 will create a proportional tilting movement thereof, including the head 40 which will in turn effect a proportional displacement of the ball valve 14 which will in turn effect a proportional flow of water through the passage 40 excluding the bore 47 or including the bore 47, depending of course upon the force applied to the drinker pin 14. This has been found a particularly effective way of providing water to turkeys who not only laterally peck at and displace the pin portion 45, but also mouth the entire end of the pin portion 45, particularly when the turkeys are relatively large. In this case the water flowing through the bore 47 flows directly into the turkey's mouth, both through the bore 47 and the channels 50, thereby assuring maximum watering and minimum drip. Obviously, each time the ball valve 14 unseats from the concave surface or valve seat 43, any debris which may have accumulated upon the concave surface 43 (or upon the opposing surface of the ball valve 14) is flushed therefrom through the bore 47. This is particularly efficient since, as noted earlier, the ball valve 14 is lifted under higher lateral forces and therefore under greater water velocity flow through the bore 47 assuring efficient cleaning/flushing of the concave surface 43.

Although a preferred embodiment of the invention has been specifically illustrated and described herein, it is to be understood that minor variations may be made in the apparatus without departing from the spirit and scope of the invention as defined in the appended claims.

I claim:

1. A nipple particularly adapted for feeding liquid to fowl and/or small animals comprising a housing including means for defining a passage through which liquid can pass, valve means in said passage for controlling the flow of liquid therethrough, said valve means includes a valve normally seated upon a first valve seat and closing said passage, a stem defined by a head and a pin, said head having an upper surface contiguous said valve and being adapted to unseat said valve from said first valve seat upon actuation of said pin by a fowl or small animal, said pin having an end portion projecting out of said housing, said end portion including an end face, a bore through said stem extending between said upper surface and said end face, and means in said passage for underlyingly supporting said head for tilting movement upon lateral force application to said pin whereby water will selectively flow both through said bore and passage in proportion to a first lateral force applied to said pin in a first position of said pin and water will flow only through said passage past said first valve seat in proportion to a second lateral force less than the first lateral force applied to said pin in a second position of said pin.

2. The nipple as defined in claim 1 wherein said pin has an exterior surface, and at least one axially extending radially outwardly opening channel defined by said exterior surface along which water flows upon the tilting movement of said head.

3. The nipple as defined in claim 2 wherein said at least one channel converges in a direction toward said end face.

4. The nipple as defined in claim 2 wherein said at least one channel converges in a direction toward said end face.

5. The nipple as defined in claim 1 wherein said pin has an exterior surface, at least one axially extending radially outwardly opening channel defined by said exterior surface along which water flows upon the tilting movement of said head, and said at least one channel is disposed generally parallel to said bore.

6. The nipple as defined in claim 1 wherein said pin has an exterior surface; and a plurality of radially spaced axially extending and radially outwardly opening channels defined by said exterior surface along which water flows upon the tilting movement of said head.

7. The nipple as defined in claim 6 wherein each of said channels converges in a direction toward said end face.

8. The nipple as defined in claim 1 wherein said pin has an exterior surface; a plurality of radially spaced axially extending and radially outwardly opening channels defined by said exterior surface along which water flows upon the tilting movement of said head, and said channels are disposed generally parallel to said bore.

9. The nipple as defined in claim 1 wherein said upper surface is concave.

10. The nipple as defined in claim 9, wherein said upper concave surface defines a second valve seat associated with said valve.

11. The nipple as defined in claim 10 including a third valve seat between said first and second valve seats, a fourth valve seat downstream of said second valve seat, and said head has a lower surface normally seating upon said fourth valve seat.

12. The nipple as defined in claim 11 wherein said pin has an exterior surface, and at least one axially extending radially outwardly opening channel defined by said exterior surface along which water flows upon the tilting movement of said head.

13. The nipple as defined in claim 11 wherein said pin has an exterior surface, at least one axially extending radially outwardly opening channel defined by said exterior surface along which water flows upon the tilting movement of said head, and said at least one channel is disposed generally parallel to said bore.

14. The nipple as defined in claim 11 wherein said pin has an exterior surface; and a plurality of radially spaced axially extending and radially outwardly opening channels defined by said exterior surface along which water flows upon the tilting movement of said head.

15. The nipple as defined in claim 14 wherein each of said channels converges in a direction toward said end face.

16. The nipple as defined in claim 11 wherein said pin has an exterior surface; a plurality of radially spaced axially extending and radially outwardly opening channels defined by said exterior surface along which water flows upon the tilting movement of said head, and said channels are disposed generally parallel to said bore.

* * * * *